Jan. 25, 1966  R. C. PRATT  3,230,980
PLASTIC TUBULAR MEMBER
Original Filed Oct. 16, 1959  2 Sheets-Sheet 1

INVENTOR.
ROBERT C. PRATT
BY
Robillard & Pattiton
ATTORNEYS

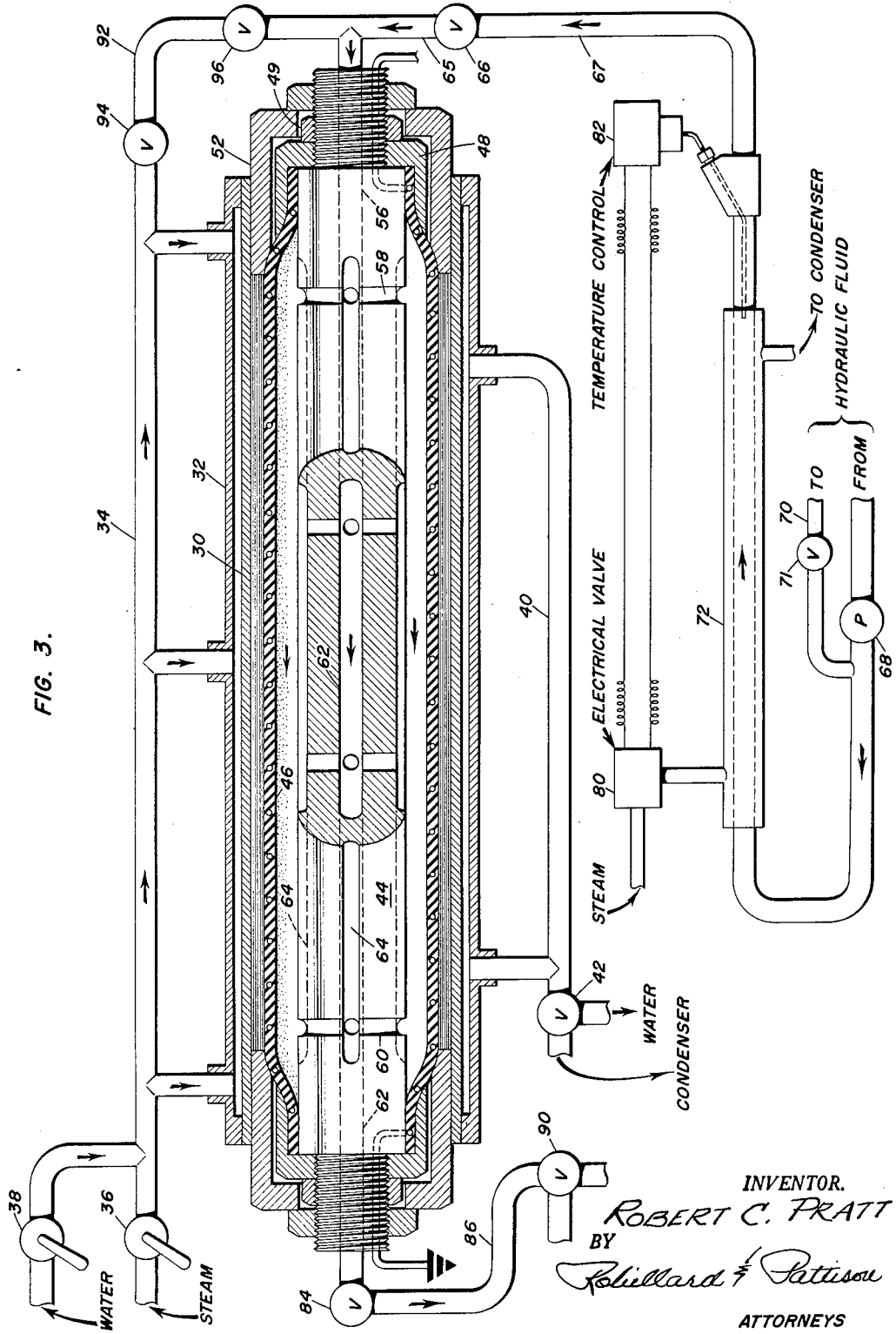

United States Patent Office 3,230,980
Patented Jan. 25, 1966

3,230,980
PLASTIC TUBULAR MEMBER
Robert C. Pratt, Joplin, Mo., assignor to Babbitt Pipe Company, Inc., West Hanover, Mass.
Original application Oct. 16, 1959, Ser. No. 846,878, now Patent No. 3,125,478, dated Mar. 17, 1964. Divided and this application Oct. 10, 1960, Ser. No. 61,528
1 Claim. (Cl. 138—144)

The present invention relates to plastic tubular members, and the method of an apparatus for manufacturing the same, and is a division of application Ser. No. 846,878, filed October 16, 1959 by Robert C. Pratt, now Patent Number 3,125,478 granted Mar. 17, 1964.

The invention contemplates the use of reinforcing sheet material and thermo-setting resins, wherein the entire mass is amalgamated together into a strong rigid structure. The use of fibrous materials is commonplace but it has been found that when sheet material is used, and the member is manufactured by winding a preform and then expanding the preform outwardly, difficulty is encountered because of the necessity of permitting the laminates to slip on one another, thus restricting the expansion to the inherent stretchability of the material.

In accordance with the invention herein, the sheet material is mechanically or otherwise shortened, whereby it may again be stretched to approximately its original length. It is also desirable that the tubular structures be made in lengths of 20, 30 and 40 feet, and this must be done at a rapid rate of speed in order that the tubular members may be economically produced. The possibility of having sheet material which may be cut to form the required lengths, and which will have a uniform stretch throughout is remote, whereas this may be accomplished by providing a controlled stretch.

The object of this invention is to make tubular plastic members which have satisfactory time, pressure and temperature characteristics for the end use desired, by producing them under controlled expansion, and by a process which will prevent the formation of voids assuring substantial non-porosity although rapid manufacture of the tubular members is accomplished.

A further object is to produce plastic tubular members which have greatly increased strength.

These and other objects will become apparent from the description herein when read in view of the accompanying drawings, wherein:

FIGURE 3 is a cross sectional view of the apparatus used for carrying out the process herein.

Figure 1:
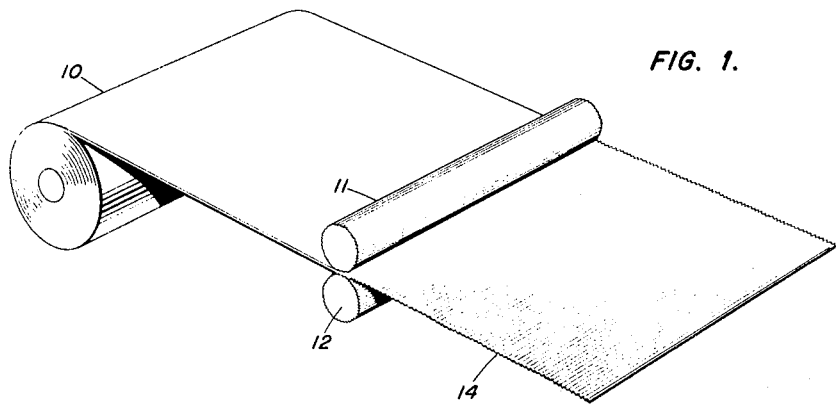
FIGURE 1 is a schematic view showing the treatment of the paper in order to provide a controlled stretch characteristic.

Generally the tubular structure members are made by spirally wrapping strips of resin treated material into a tubular preform (FIG. 2), placing within the preform an expandible mandrel and placing both within a die and then expanding the mandrel outwardly while applying heat and pressure in order to cure the resin. The reinforced sheet material utilized in the making of the preform must have a stretch characteristic because the wall thickness of the preform runs as high as 40% greater than the final wall thickness of the tubular member. Because of this it is apparent that the innermost ply must be substantially increased in circumference with each successive outer ply having a lesser increase in circumference. Heretofore fibrous materials having an inherent stretch have been extensively utilized, but it has been found that utilization of such materials requires special treatment, and when wood fibres are used, special compositions are required. Herein the fibrous sheet material is treated to provide a controlled stretch, and this can be done, in any suitable way, such as illustrated in FIG. 1, wherein a roll of fibrous sheet material 10, herein being paper, is drawn between crinkling rollers 11 and 12 which are rotating at different speeds. As the paper leaves the crinkling rollers it has been shortened to the degree desired and the controlled stretch provided, that is, if it has been shortened 10% it may be stretched 10% without placing the sheet under strain. Crinkling as used is not meant to include only shortening by such mechanical means, for example substantial shortening may be accomplished by crushing, as is evidenced by taking a new one dollar bill and rolling it into a ball. In addition to shortening the paper lengthwise it may also be transversely shortened, thus providing a double stretch for reasons hereinafter explained; such lengthwise and transverse shortening may be accomplished by crushing, as explained above.

Figure 2:
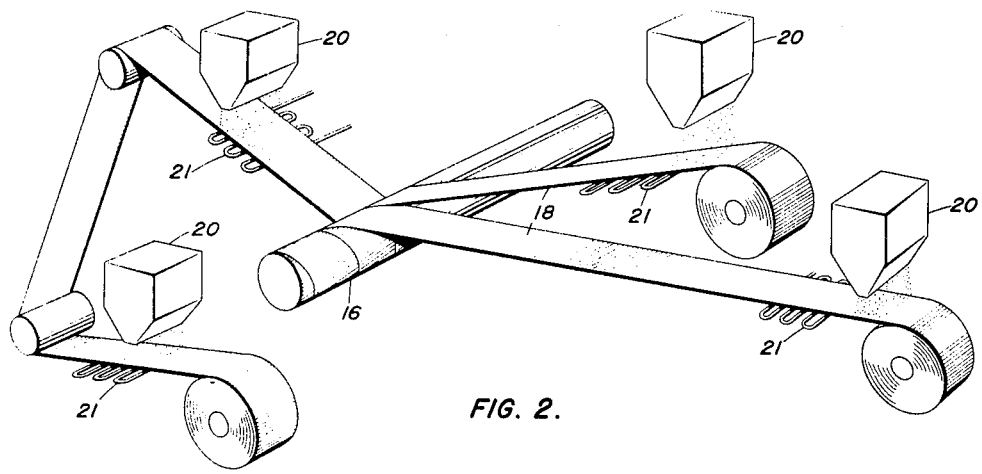
FIGURE 2 is a schematic view showing the resin treatment of the shortened paper and the winding of it into a preform.

One of the advantages of utilizing the stretchable paper is that the treatment heretofore followed of impregnating the sheet with phenolic resin by drawing it thru a bath of A stage phenolic then curing it to the B stage may be eliminated, and the cost reduced accordingly. As shown in FIG. 2 as the strips 18 are drawn onto a mandrel to wind the preform, resin is deposited directly thereon from shakers 20. Inasmuch as each successive ply will overly the next one the resin will be held in position until the curing is accomplished.

If, however, the preform is subject to extensive handling, or it must be coated on both sides, as indicated in FIG. 2, the strips may be heated by suitable heating elements 21 to cause the resin to soften sufficiently to adhere thereto. During the winding of the preform the plies may be stretched so as to elongate the paper, while leaving the degree of stretch therein as required for expansion during the molding operation. In this way, the preform may be fabricated without straining the fibrous material, and, moreover, by not stretching the sheet to its full length, it presents a greater surface area per square inch, thus presenting a greater bonding area. Thus during the forming of the preform, accurate control can be had, if the innermost ply must be expanded 10% and this is the limit of stretch of the paper, it will be stretched without being placed under tension. Obviously each outer ply will require less stretch when expanded so that part of the stretch may be taken out during winding. The final tubular member will thus be one wherein there is equalized tension throughout.

The reduction of the preform into a final tubular member is accomplished in the apparatus illustrated in FIG. 3, which will be initially described in order that the forming steps may be more readily followed. As therein shown, there is provided a cylindrical metal die 30 provided with a jacket 32 for the passage of fluid around the die. The jacket 32 is connected by inlet passages 34 through a control valve 36 to a source of steam or through a control valve 38 to a source of water. Diametrically opposite the inlet passages the jacket is provided with an outlet passage 40 connected through a two way control valve 42 to an outlet leading to a condenser or to the water supply. Positioned within the die is a mandrel 44, having a central cylindrical core 45, of substantially the same length as the die; and a threaded end portion 50 of reduced diameter, extending from each end thereof. Overlying the central core 44 is an expansible sleeve 46 of sufficiently greater length than the central core 44 to have its ends project beyond same, whereupon each overlapping end is turned inwardly and secured by cylindrical cup shaped collar members 48 screw threaded onto the reduced portions of the core and held by lock nuts 49.

The mandrel is positioned within the die by cylindrical collar members 52 which are forced into holding position by lock nuts, also threadedly mounted on the reduced core portions 50.

The mandrel 44 is provided with an inlet passage 56 which runs through the center to a position beyond the adjacent secured end of the sleeve 46, wherein radial passages are provided which terminate at a circumferential groove 58 cut into the face of the mandrel core 45. The opposite end of the core is provided with a similar circumferential groove 60 from which radial passages lead to an outlet passage 62. Additional circumferential grooves are spaced along the core and all are interconnected by the longitudinally extending grooves 64 for reasons hereinafter explained. The inlet passage 56 of the core is connected to a hydraulic fluid passage 65 connecting through a control valve 66 to a hydraulic fluid passage 67 into which hydraulic fluid under pressure is forced by a pump 68. A bypass 70 is provided around the pump, with a suitable release valve 71, in order to recirculate the hydraulic fluid back to its source if the pressure rises above that which is desired. The hydraulic fluid passage 67, intermediate the control valve 66 and pump 68, is surrounded by a suitable jacket 72 connected through a valve 80 to a source of steam, in order to heat the hydraulic fluid. The temperature of the hydraulic fluid is controlled through valve 80 which is electrically responsive to any suitable type of temperature control means 82 having a suitable temperature responsive element 83 located within the passage 67.

As is apparent, when the control valve 66 is open the hydraulic fluid will enter the mandrel and pass therethrough, and to control the pressure within the mandrel there is provided at the outlet end of outlet passage 62 a bleeder valve 84. This valve also connects to a passage 86 which terminates in a two way valve 90 for directing the hydraulic fluid or water to their proper sources.

In carrying out the process the preform is initially placed over the mandrel, and the mandrel with the preform thereon is placed in the die, shown in FIG. 3, wherein the mandrel sleeve is shown in expanded position. The mandrel fits close to the mandrel core, and the preform substantially fills the space between the sleeve and the inner wall of the die 30. Thereafter the collar members 52 are inserted until they abut against the ends of the preform and are locked in position.

With the preform so positioned the hydraulic fluid valve 66 is opened permitting fluid to flow into the mandrel. The fluid will initially flow into the circumferential groove 58 along the longitudinal grooves 64 into the circumferential groove 60 and then through the outlet passage 62. During this time the bleeder valve 84 is wide open and obviously the circulation of the fluid through the mandrel will force out any air within the grooves and also heat the sleeve. Thereafter the bleeder valve 84 is closed sufficiently to build up a pressure within the mandrel behind the sleeve 46.

With the fluid circulating through the mandrel and through the grooves therein it is apparent that there will be simultaneous expansion of the entire mandrel whereupon the sleeve 46 will compress the preform plies together and when the preform is made with stretchable paper the increase of pressure may be accomplished rapidly, in fact as close to instantaneously as possible. The pressure utilized is that which will cause maximum compressibility toward final wall thickness, the range being from 900 to 1500 lbs. per square inch. This high pressure also drives the resin into the wood fibre and a consolidation of the mass is accomplished.

When so compressed the resin is brought into intimate contact and rapid heat transfer occurs. More important, however, is the fact that under such pressure moisture within the preform will not reach a temperature where it will flash off into steam but is retained as minute droplets dispersed through the entire preform. By preventing such flashing off, voids will not be formed and the resulting tubular member will be, for all practical uses, non-porous.

Simultaneously with the application of pressure heating fluid is passed around the die and as the hydraulic fluid is also heated, rapid curing is accomplished. The temperature should be raised to approximately 320°, and the time required will be approximately one minute per ply plus five minutes.

Following the curing it is essential in order to obtain rapid manufacture and also to prevent the formulation of voids, that the finished tubular member be rapidly cooled. To accomplish this, cold water valve 38 is opened and cooling water is fed to the jacket 32 surrounding the die, the steam control valve 36 meanwhile having been closed. If desired, cooling water may also be fed through the mandrel through bypass 92 and valves 94 and 96. During the cooling the pressure on the sleeve is gradually diminished but the pressure retained is sufficient during the cooling period to assure that water droplets will not flash into steam.

A distinct advantage in using shortened stretchable paper is the fact that substantially more fibrous material per unit length is obtained than when the paper is not shortened, thus increasing the hoop tensile strength particularly as the thickness of the wall is increased. A four inch outside diameter tubular member having a quarter inch wall thickness shows an increase in hoop tensile strength of 30%.

Although fibrous sheets of wood pulp have been described throughout, it is apparent that other fibrous materials could be used. Sheet asbestos is one example and it may be shortened by minute pleating. Preferably the sheet should have sufficient body to avoid use of special means to prevent sagging when winding as occurred when using crepe paper. A sheet having a 10 mil thickness is preferred.

As previously mentioned the material may be both longitudinally and transversely shortened. The width of each ply is reduced but more fibres are crowded into the same width giving increased axial strength, and it also assists in keeping the abutting edges of the spiral preform firmly against one another as it is wound as shown in FIG. 2.

The invention having been defined, the following is claimed:

A rigid tubular member comprising a plurality of plies of pre-crinkled paper stretched to equalize the tension throughout and secured together, as tensioned, by a cured resin.

References Cited by the Examiner

UNITED STATES PATENTS

| | | | |
|---|---|---|---|
| 1,299,031 | 4/1919 | Reynolds | 138—150 |
| 2,170,945 | 8/1939 | Greene | 138—109 XR |
| 2,213,290 | 9/1940 | Rowe. | |
| 2,343,930 | 3/1944 | Rowe | 154—46 XR |
| 2,380,111 | 7/1945 | Kasten | 93—80 XR |
| 2,669,258 | 2/1954 | Spitz | 154—83 XR |
| 2,768,920 | 10/1956 | Stout | 156—184 |
| 2,854,031 | 9/1958 | Donaldson | 138—141 |
| 2,862,541 | 12/1958 | Brink | 137—137 XR |

LAVERNE D. GEIGER, *Primary Examiner.*

EDWARD V. BENHAM, *Examiner.*